United States Patent
Stone et al.

(10) Patent No.: US 7,978,599 B2
(45) Date of Patent: Jul. 12, 2011

(54) METHOD AND SYSTEM TO IDENTIFY AND ALLEVIATE REMOTE OVERLOAD

(75) Inventors: Joseph Roy Stone, Plano, TX (US); Flemming Stig Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1055 days.

(21) Appl. No.: 11/561,286

(22) Filed: Nov. 17, 2006

(65) Prior Publication Data

US 2008/0117816 A1 May 22, 2008

(51) Int. Cl.
*H04L 12/26* (2006.01)
*H04L 1/00* (2006.01)
*H04J 3/14* (2006.01)
*H04J 1/16* (2006.01)
*G01R 31/08* (2006.01)
*G06F 11/00* (2006.01)
*G08C 15/00* (2006.01)

(52) U.S. Cl. ........ 370/229; 370/230; 370/236; 370/250; 370/251

(58) Field of Classification Search .................. 370/250, 370/251, 229–237; 451/7, 11
See application file for complete search history.

(56) References Cited

U.S. PATENT DOCUMENTS

| | | | | |
|---|---|---|---|---|
| 7,013,346 | B1 * | 3/2006 | Tucker | 709/236 |
| 7,027,389 | B2 * | 4/2006 | Stewart | 370/218 |
| 2004/0110499 | A1 * | 6/2004 | Kang et al. | 455/422.1 |
| 2006/0190603 | A1 * | 8/2006 | Anzai et al. | 709/226 |

* cited by examiner

*Primary Examiner* — Hong Cho
*Assistant Examiner* — Gautam Sharma
(74) *Attorney, Agent, or Firm* — Schwegman, Lundberg & Woessner, P.A.

(57) ABSTRACT

A method and system to identify an overload state in a remote network device within a communications network in which a local network device can send at least one message to the remote network device. The method comprises detecting at least one message transmission timeout for the message sent from the local network device to the remote network device, the message transmission timeout corresponding to a retransmission of the message from the local network device to the remote network device. The number of message transmission timeouts for the message or several messages is counted, with the method further comprising comparing the number of message transmission timeouts to a predetermined timeout threshold so that an overload state for the remote network device can be inferred when the number of message transmission timeouts exceeds the predetermined timeout threshold.

30 Claims, 12 Drawing Sheets

METHOD AND SYSTEM TO IDENTIFY AND ALLEVIATE REMOTE OVERLOAD

FIELD

This application relates to a method and a system to identify and alleviate remote overload, and in an example embodiment to a method and system to relate command/transaction timeouts and responses to identify and alleviate remote overload in a Voice over IP (VoIP) system.

BACKGROUND

In a VoIP system, devices may communicate through the exchange of call control signaling. VoIP signaling protocols (e.g. SIP, MGCP, and Megaco/H.248) may define a command message transmission timeout. In an example embodiment, this timeout may be defined when the protocol is used over an unreliable transport, for example User Datagram Protocol (UDP). A command message transmission timeout may occur when a final response message is not received within a timeout period. A command message may be retransmitted a number of times with an exponential backoff between retransmissions. A transaction timeout may occur when all retransmissions of a command message have been exhausted without receiving a final response message.

There may be two different classes of VoIP systems, including Decomposed Gateways, as supported by MGCP, NCS, TGCP, and Megaco/H.248, and Intelligent Endpoints, as supported by SIP and H.323.

In the decomposed gateway architecture, there may be a Media Gateway Controller (MGC) and a Media Gateway (MG). In the Intelligent Endpoint architecture, there may be endpoints (e.g. SIP User Agents), and intermediaries (e.g. SIP proxies). Both types of systems may support client-server style signaling where a client may send a transaction request to a server and expect to receive zero, one or more provisional response messages followed by a final response message for the transaction.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

Figure 1A:
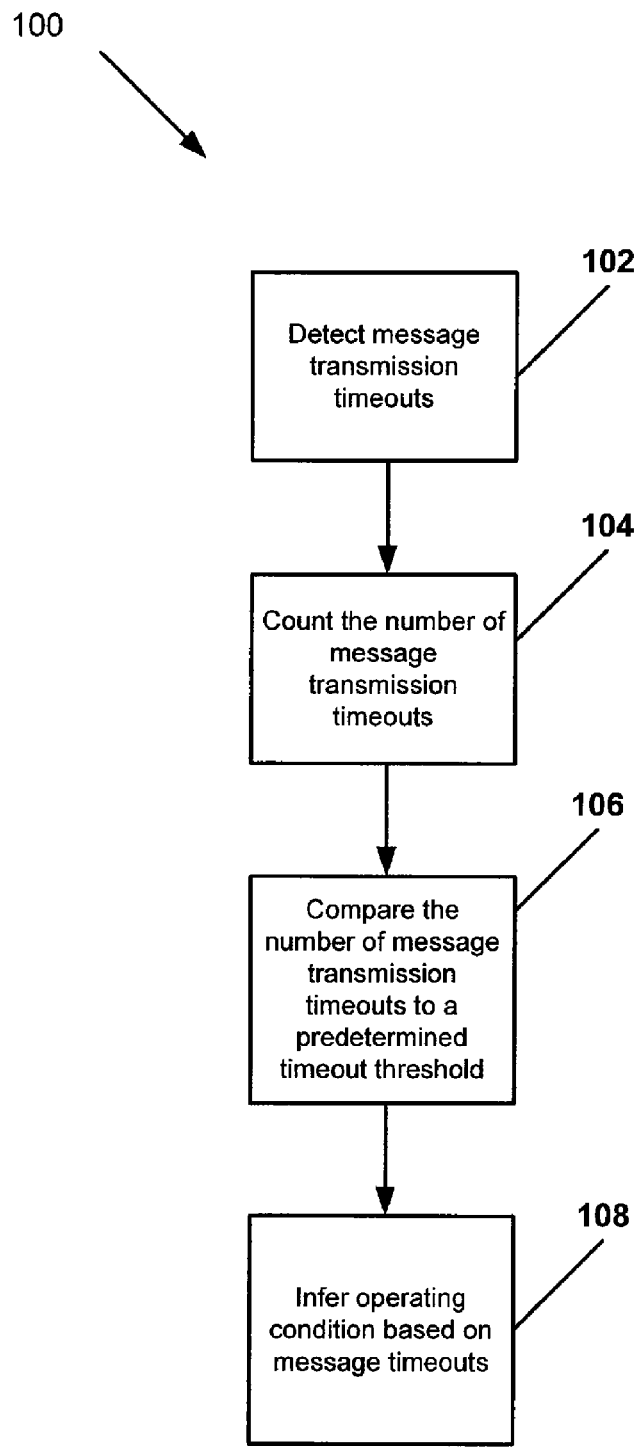
FIG. 1A shows a method, in accordance with an example embodiment, for identifying a remote overload condition in an example VoIP network.

In the following description, for purposes of explanation, numerous specific details are set forth in order to provide a thorough understanding of an embodiment of the present disclosure. It will be evident, however, to one skilled in the art that the present disclosure may be practiced without these specific details.

Overview

A method for controlling communication between a local network device and a remote network device is provided. The method may include monitoring message transmission timeouts for one or more messages sent from the local network device to the remote network device. The method may associate an operational status with the remote network device based on the monitored message timeouts, so that communications from the local network device to the remote network device based on the operational status may be controlled.

Example Embodiments

Example embodiments show deployment in a Media Gateway Control Protocol (MGCP) environment. It is however to be noted that the example embodiments are not restricted to MGCP but may apply in any scenario, using any protocol (NCS, TGCP Megaco/H.248, SIP, H.323 or the like), to communicate in a client server arrangement.

MGCP retransmissions may be used to achieve reliable delivery as well as actual processing of call signaling messages on a per endpoint basis. MGCP treats each endpoint independently, and hence has independent transmission and retransmission procedures on a per-endpoint basis. If a response message is not received before a retransmission timer fires, the command message may be retransmitted up to a maximum transaction lifetime. Lack of a timely response may occur for a variety of reasons, including a datagram/packet being lost by the network, long processing delays due to a pending overload, or a command being dropped due to severe overload. Retransmissions tend to compound an overload situation. MGCP defines an exponential back-off algorithm, which may limit the extent to which the retransmissions further overload the server, but does nothing to identify or alleviate remote overload.

Any one or more of the network devices mentioned above may become overloaded. Overload may result from any one of a number of conditions including CPU utilization, memory utilization, call/transaction rate and queue depths. In order to address overload on a server, the average incoming message rate may need to be reduced, which in turn may imply a need for a feedback loop to the client(s). A server may, from a client's perspective, and in an example embodiment, be in any one of three example states, namely a "Normal" state, a "Remote Pending Overload" state, or "Remote Overloaded" state.

In the Normal state, the server may be processing incoming messages without any load problems. In the Remote Pending Overload state, the server may be capable of processing incoming messages; however, the rate at which they are arriving may not be sustainable and may need to be reduced. In the Remote Overloaded state, the server may no longer be able to process incoming messages and may either reject them or simply discard them.

In the case of MGCP, two return codes have been defined for this. Code 101 may indicate a Pending Overload state, where processing is still possible, and the transaction continues processing. Code 409 may indicate an Overloaded state, where processing is currently not possible, and the transaction may thus fail. In both cases, the client may need to reduce the load on the server by reducing its average message sending rate in order for the system to return to normal operation.

In the case of SIP, one return code (503) has been defined to indicate a current overload state, where processing of the message may currently not be possible and the transaction may thus fail.

The prior art overload control feedback loops rely on explicit signaling feedback sent from the server to the client in order to get the client to reduce its sending rate. If the client does not receive the feedback, the load it presents to the server may not be adjusted accordingly. In cases of significant overload, which may occur when a lot of different clients send messages to a single server, or when a single client sends a lot of messages to a single server, the feedback may either be lost (e.g. because of one-way communication or the server or intervening network may be so overloaded that it drops messages) or it may not be possible for the server to communicate the overload condition to the client in a timely manner. In such cases, the clients may simply continue sending messages to the overloaded server, possibly further exacerbating the overload situation.

Referring to FIG. 1A, a method 100, in accordance with an example embodiment, is shown for identifying an overload condition or state in a remote network device (or network element). In an example embodiment, the method 100 may identify an overload state in a remote network device without explicitly receiving an indication from the remote network device of operating conditions at the remote network device. The method 100 may be performed at a local network device (e.g., a SIP User Agent or Media Gateway) configured for Voice over Internet Protocol (VoIP) communications and that sends messages (e.g., via packets or datagrams) to the remote network device (e.g., a SIP proxy or Media Gateway Controller). When an overload condition or state is inferred or presumed, a message sending rate may be decreased.

In an example embodiment, the method 100 may comprise detecting message transmission timeouts for each message sent from the local network device to the remote network device, as indicated by block 102. In an example embodiment, the first transmitted message and each retransmission of the message may have a corresponding transmission timeout. The number of message transmission timeouts for the message may then be counted (e.g., by incrementing a counter), as indicated by block 104. The cumulative number of message transmission timeouts (e.g. message transmission timeouts for this and other messages) may then be compared to a predetermined timeout threshold, as indicated by block 106. Accordingly, an overload state for the remote network device can be inferred based on the comparison between the cumulative number of message transmission timeouts and the predetermined timeout threshold (see block 108).

In an example embodiment, the message transmission timeout may comprise a command message transmission timeout. For example, each time a command message transmission timeout occurs a command message transmission timeout counter may be incremented and each time a final response message not indicating overload to the command message is received from the remote network device the command message transmission timeout counter may be decremented. A Normal, Pending Overload, or an Overloaded state for the remote network device may be inferred based on the number of command message transmission timeouts provided by the command message transmission timeout counter and comparing this to a command message transmission timeout threshold. In the MGCP example embodiment, when the number of command message transmission timeouts exceeds the command message transmission timeout threshold, a Pending Overload state for the remote network device may be inferred. It is, however, to be noted that this relatively simple counter increment/decrement relationship between command message transmission timeouts and final response messages is just one example relationship that may be used to infer the state of the remote network device. In an example embodiment, the method 100 comprises further decreasing a rate at which the message is retransmitted (above and beyond the normal exponential backoff) from the local network device (e.g., a telephony endpoint) to the remote network device (e.g., VoIP server).

In an example embodiment, the message transmission timeout may comprise a transaction timeout. For example, the transaction timeout may occur when all retransmissions of a command message have been exhausted without receiving a final response message. A transaction timeout counter may be provided to count the number of transaction timeouts for the remote network device, and to accordingly infer an Overloaded state for the remote network device. In the MGCP example embodiment, when the number of transaction timeouts exceeds a transaction timeout threshold, an Overloaded state for the remote network device may be inferred. In such a case, the method 100 may comprise aborting the retransmission of the message (and in one example embodiment, all messages) from the local network device to the remote network device.

It should thus be noted that the method 100 may monitor both command message transmission timeouts and transaction timeouts, and by comparing each of these timeouts to associated timeout thresholds, the local network device may itself infer or assume an operating status or condition of the remote network device without requiring any explicit indication from the remote network device as to its status.

In an example embodiment, the local network device may comprise a plurality of endpoints (e.g., VoIP telephony endpoints), each endpoint being capable of sending a message in a packet to the remote network device. The method 100 may comprise monitoring the number of message transmission timeouts across the plurality of endpoints, and inferring an overload state for the remote network device for all the endpoints when the number of message transmission timeouts for any one endpoint or the cumulative number of message transmission timeouts for a set of endpoints exceeds the predetermined timeout threshold. Thus, cross-endpoint procedures may be utilized to enhance overload handling.

Figure 1B:
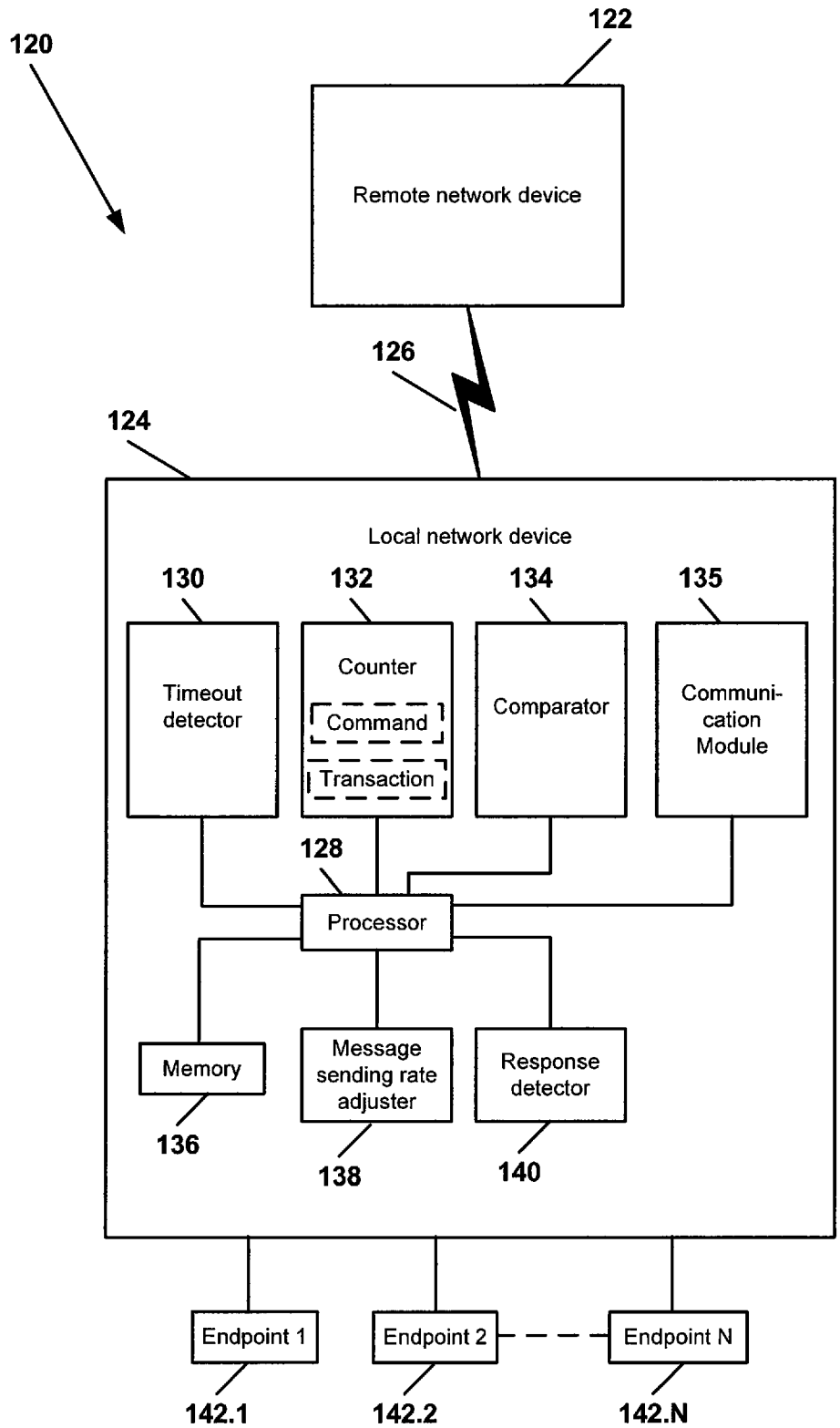
FIG. 1B shows a VoIP system, in accordance with an example embodiment, for identifying remote overload condition.

Referring to FIG. 1B, in an example embodiment, a VoIP system 120 is shown to identify an operating condition (e.g., an overload condition) in a remote network device. For example, the system 120 may be configured to identify an overload condition in a remote network device 122 within a communications network based on monitoring command message transmission timeouts and/or transaction timeouts (which may cumulatively be referred to as message transmission timeouts). A local network device 124 (e.g., a VoIP endpoint) may send messages to the remote network device as indicated by arrow 126 and may use a communication module 135 which is configured to communicate with a remote network device. The system 120 may comprise a processor 128 to control the operation of the system 120. In an example embodiment, the system 120 comprises a timeout detector 130 to detect at least one message transmission timeout for the message sent from the local network device 124 to the remote network device 122. The system 120 may further comprise a counter 132, which may include a transaction counter (e.g., a transaction timeout counter) and a command message counter (e.g., a command message transmission timeout counter), to count the number of message transmission timeouts for the message. A comparator 134 may be provided to compare the number of message transmission timeouts to a predetermined timeout threshold so that an overload state for the remote network device 122 can be inferred when the number of message transmission timeouts exceeds (or is equal to) the predetermined timeout threshold. A memory 136 may be provided to store the predetermined timeout threshold.

In an example embodiment, the system 120 may comprise a message sending rate adjuster 138 to adjust a rate at which messages are sent from the local network device 124 to the remote network device 122.

In an example embodiment, the message transmission timeout comprises a command message transmission timeout. The command message transmission timeout may have an associated predetermined command message transmission timeout threshold, which may be stored in the memory 136. Should the number of command message transmission timeouts exceed the predetermined command message transmission timeout threshold, the message sending rate adjuster 138 may decrease a rate at which the message is retransmitted from the local network device 124 to the remote network device 122. In these circumstances, the local network device 124 may infer that the remote network device 122 is in a pending overload state without any prompting or direct communication from the remote network device 122.

In an example embodiment, the message transmission timeout may comprise a transaction timeout (optionally in addition to the command message transmission timeout). The transaction timeout may have an associated predetermined transaction timeout threshold, which may be stored in the memory 136. Should the number of transaction timeouts exceed the predetermined transaction timeout threshold, the message sending rate adjuster 138 may abort the retransmission of the message from the local network device 124 to the remote network device 122. In these circumstances, the local network device 124 may infer that the remote network device 122 is in an overloaded state without any prompting or direct communication from the remote network device 122.

In an example embodiment, the system 120 comprises a response detector 140 to detect a response message received from the remote network device 122, so that the counted number of command message transmission timeouts for the message may be decreased. The comparator 134 may compare the number of command message transmission timeouts to a predetermined command message transmission timeout threshold, which may be stored in the memory 136 so that a Pending Overload state for the remote network device 122 may be inferred.

In an example embodiment, the local network device 124 comprises a plurality of endpoints 142.1 up to 142.N wherein each endpoint 142.1-142.N (e.g., VoIP endpoints) is capable of sending a message to the remote network device 122 via the local network device 124. The timeout detector 130 may detect the number of message transmission timeouts across the plurality of endpoints 142.1-142.N so that an overload state for the remote network device 122 may be inferred for all the endpoints 142.1-142.N when the number of message transmission timeouts for any one endpoint 142.1-142.N or the cumulative number of message transmission timeouts for all of the endpoints 142.1-142.N exceeds the predetermined timeout threshold.

In an example embodiment, the method 100 may use the methodology of a method 200 discussed in more detail below. However, it is to be noted that the method 100 is not restricted to the use of the method 200 and, likewise, the method 200 is not restricted to use in the method 100.

Figure 2A:
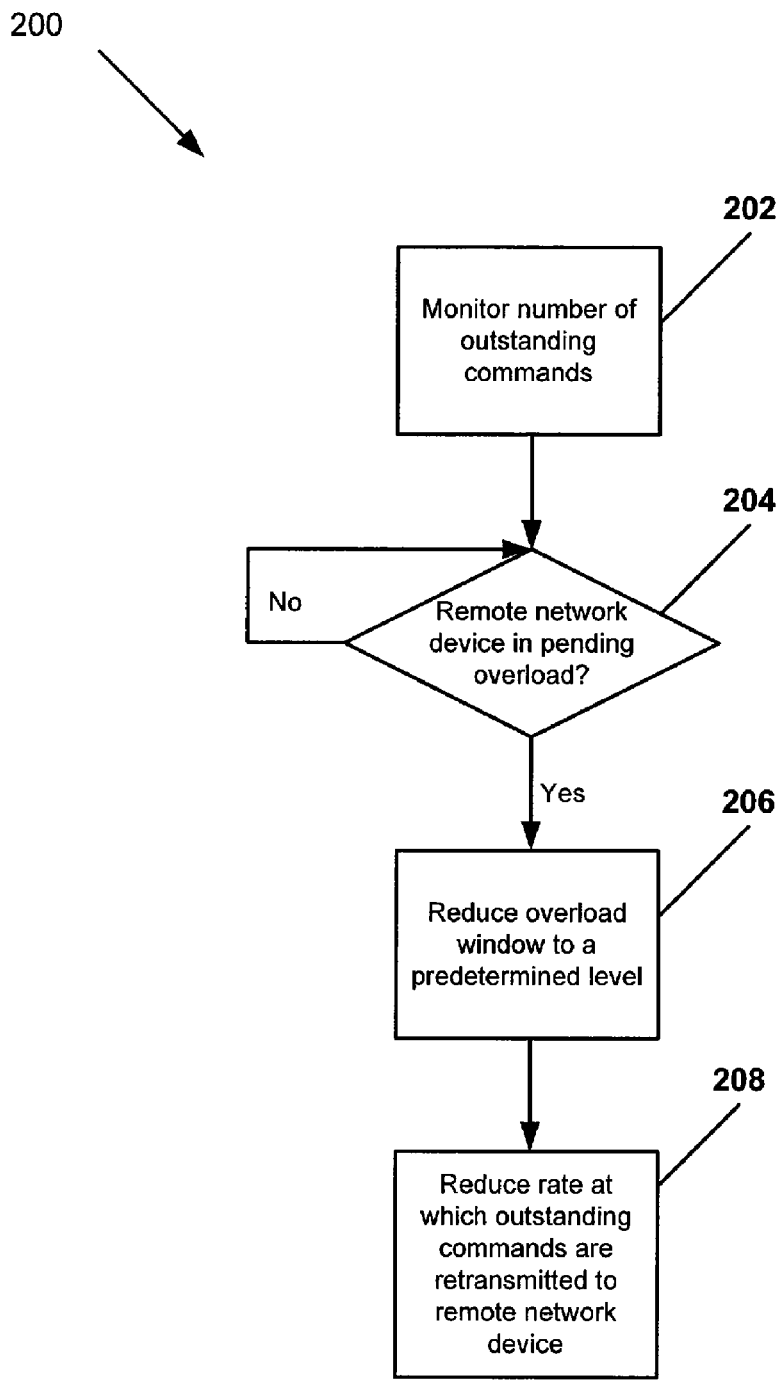
FIG. 2A shows a flow chart of a method, in accordance with an example embodiment, for controlling a command sending rate.

Referring to FIG. 2A, in an example embodiment, the method 200 may be utilized for controlling a command sending rate at which commands are sent from a local network device (e.g. the device 124 in FIG. 1B) to a remote network device (e.g. the device 122 in FIG. 1B). It should be noted that the local network device and the remote network device may form part of a VoIP communications network. The local network device, in an example embodiment, may comprise an outstanding command queue to store outstanding commands that have been sent to the remote network device and for which the local network device is awaiting a final response from the remote network device. In an example embodiment, the local network device may also comprise a pending command queue to store commands that are still to be sent to the remote network device.

The method 200 may comprise monitoring the number of outstanding commands, as indicated in block 202, until the outstanding commands substantially corresponds to an overload window. The overload window, in an example embodiment, may correspond to a dynamic limit on the outstanding commands. A state of the remote network device may then be determined based on the number of outstanding commands. If the remote network device is in a Pending Overload state, as indicated by decision block 204, the method 200 may further comprise reducing the overload window to a predetermined level, as indicated in block 206, and further reducing a rate at which the outstanding commands are resent (beyond normal exponential backoff) to the remote network device, as indicated by block 208, until the outstanding commands substantially corresponds to the Reduced Overload window. The remote network device may be categorized as being in a Pending Overload state either by the inferring methodology described above (see the method 100) or by expressly receiving a return code from the remote network device indicating that it is in a Pending Overload state.

Figure 2B:
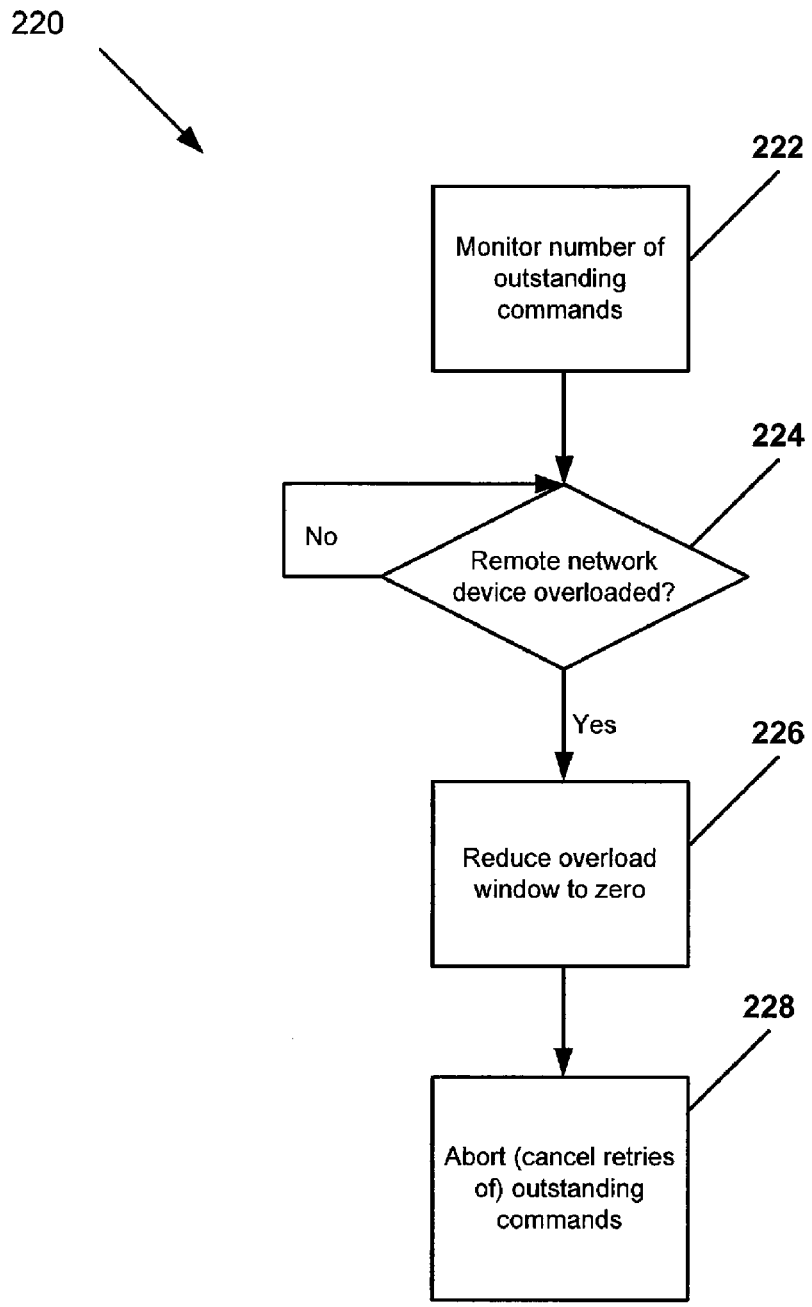
FIG. 2B shows a flow chart of a method, in accordance with an example embodiment, for controlling a command sending rate.

Referring to FIG. 2B, in an example embodiment, a method 220 is shown for controlling a command sending rate at which commands are sent from a local network device (e.g. device 124 in FIG. 1B) to a remote network device (e.g. device 122 in FIG. 1B). The local network device and the remote network device may form part of a VoIP communications network, with the local network device, in an example embodiment, comprising an outstanding command queue to store outstanding commands that have been sent to the remote network device and for which the local network device is awaiting a final response from the remote network device. In an example embodiment, the local network device may also comprise a pending command queue to store commands that are still to be sent to the remote network device.

The method 220 may comprise monitoring the number of outstanding commands, as indicated in block 222, until the number of outstanding commands falls within an overload window. The overload window, in an example embodiment, may correspond to a dynamic limit on the outstanding commands. A state of the remote network device may then be determined. If the remote network device is in an Overloaded state, as indicated by decision block 224, the method 220 may further comprise reducing the overload window to zero, as indicated by block 226. In addition, the sending of all outstanding commands from the outstanding command queue may be aborted or terminated, as indicated by block 228, and all retries of the outstanding commands from the outstanding command queue may be cancelled. The local network device may, however, continue to receive responses corresponding to the outstanding commands. In a further example embodiment, the pending commands in the pending command queue may be destroyed in a predetermined manner (e.g. first destroying the oldest pending commands).

Figure 3:
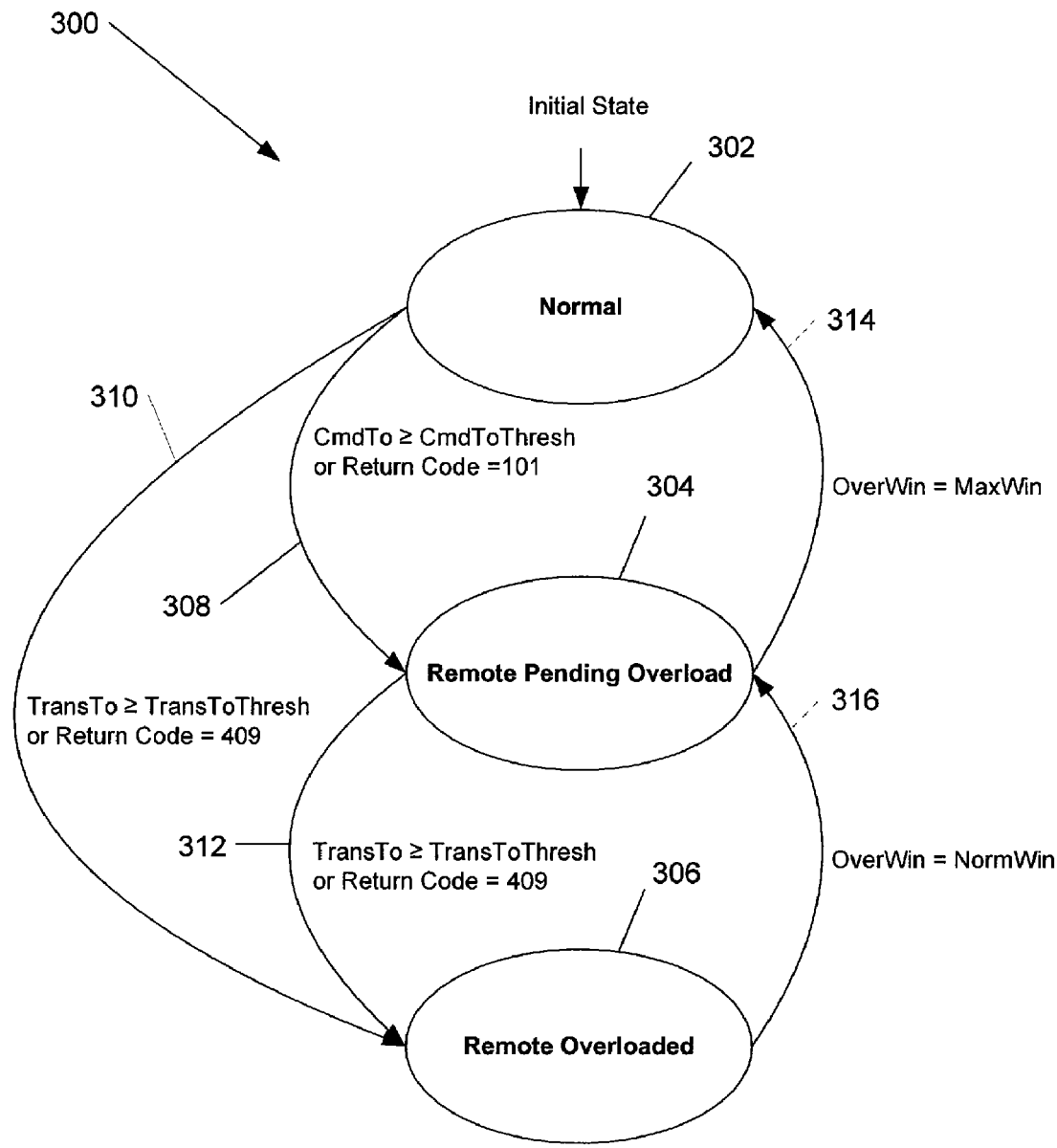
FIG. 3 shows a remote overload handling state transition diagram, according to an example embodiment.

Turning now to FIG. 3, reference 300 generally indicates a state transition diagram of states of a remote network device (e.g., the remote network device 122). In an example embodiment, the local network device may deem the remote network device to be in any one of three states, namely a "Normal" state 302, a "Remote Pending Overload" state 304, or an "Remote Overloaded" state 306. In the example MGCP environment, if either of the return codes 101 (pending overload) or 409 (overloaded) is received, then the remote network device may be transitioned to the relevant state by the local network device, but, in addition, if a command message transmission timeout (CmdTo) count or transaction timeout (TransTo) count meets or exceeds respective predetermined thresholds, then the local network device may assign the associated state to the remote network device. Thus, if a local network device (e.g., the network device 124) determines that the command message transmission timeout (CmdTo) exceeds the predetermined command message transmission timeout threshold (CmdToThresh), or it receives a return code of 101, as indicated by arrow 308, then it may assign a "remote pending overload" condition to the remote network device 122. If the local network device 124 determines that the transaction timeout (TransTo) exceeds the predetermined transaction timeout threshold (TransToThresh), or it receives a return code of 409, as indicated by arrows 310 and 312, then it may assign a "remote overloaded" condition to the remote network device 122. It should be noted that the local network device infers an operating condition of the remote network device without necessarily receiving an explicit communication (e.g., the return codes 101 and 409) from the remote network device indicating its operating condition. However, explicit communications from the remote network device 122 may nevertheless be taken into account.

Arrows 314 and 316 show how the status of the remote device may move from the pending overload state 304 back to the normal state 302 and from the overloaded state 306 back to the pending overload state 304, as described in more detail below.

In an example embodiment and further to the discussion above, the local network device (e.g. a local client) may maintain a count of the number of command message transmission timeouts, CmdTo, to a particular remote network device (e.g. a server) which, in turn, may enable the local client to detect (or infer) pending overload without explicit feedback, and hence adjust the sending rate accordingly. Whenever the command retransmission timer fires, a CmdTo counter may be incremented by one. Whenever a final response not indicating overload is received, the CmdTo counter may be decremented by one. If the CmdTo count exceeds a command message transmission timeout counter threshold, CmdToThresh, as indicated by arrow 308 in FIG. 3, the local client may assume that the remote server is in a pending overload state, even though a response to that effect has not actually been received (in fact, the client may not have received any responses at all). As a consequence, the local client may now transition the server (the local network device) to the "remote pending overload" state and start reducing its average sending rate. Depending on further observed behavior from the server (the remote network device), the client may stay in this state, transition to the "normal" state or transition to the "overloaded" state. In an example embodiment, the status of the remote network device may be inferred based on a predetermined lapsed period of time. Example details of how the sending rate may be adjusted (both up and down) are described by way of example further below.

In an example embodiment, the state transition diagram 300 may represent states arising during the execution of the method 100 and/or states of the system 120. Accordingly, the method 100 and the system 120 may also maintain a count of the number of transaction timeouts, TransTo, to a particular server (remote network device) which, in turn, may enable the local client to infer or (detect) actual overload without explicit feedback and hence adjust the sending rate accordingly. Whenever a transaction times out, a TransTo counter may be incremented by one. Whenever a final response not indicating overload is received from the remote network device, the TransTo counter may be decremented by one. If TransTo exceeds a transaction timeout threshold, TransToThresh, as indicated by arrows 310 and 312 in FIG. 3, the local client may assume that the remote server (remote network device) is in the "remote overloaded" state 306 and cannot currently process any further messages, even though a response to that effect has not actually been received (in fact, the client may not have received any responses at all). As a consequence, the client may now transition the server to the "remote overloaded" state 306 and stop sending new commands. Furthermore, the client may abort or terminate any outstanding commands to help the server recover from its current overload. Depending on further observed behavior from the server, the client may either consider that the server is still in this state, or transition the server (remote network device) to the "remote pending overload" state 306 while adjusting the sending rate accordingly. In an example embodiment, and as indicated above, the status of the remote network device may be inferred based on a predetermined lapsed period of time.

In other words, example embodiments of the methods and systems described herein relating command/transaction timeouts, response messages, and lack of response messages in order to determine an operating conditional such as a pending overload condition and/or an actual overloaded condition. This relationship may be represented by two counters (command message and transaction timeout respectively, e.g., shown by reference numeral 132 in FIG. 1B) which may simply be incremented and decremented by one with each timeout and final response message not indicating overload, respectively. In addition, the example embodiments of the methods and systems described herein may provide multiple states that are more or less than the three states described above, namely "Normal", "Remote Pending Overload" and "Remote Overloaded" states. In other words, multiple thresholds, and not only the command message and transaction timeout thresholds described above may be provided to transition between the multiple states. Each of these states may be entered without any explicit communication from the remote network device (a return code 101, a return code 409, or the like).

Although the example methods and systems described above have been described with reference to a single endpoint, it may still lead to a large number of messages being generated on a network in general. This may take place in many commonly encountered VoIP use cases (where a client may not generate a lot of messages to the same server simultaneously). Clients that comprise more than one endpoint communicating with the same server may improve on this by applying the above procedures across the set of endpoints communicating with the same server. In an example embodiment, which will be described in more detail with reference to FIG. 4, the method and system described above may be applied to circumstances where there may be multiple endpoints on the client that communicate with the server in the "Remote Pending Overload" or "Remote Overloaded" state, with the method then furthermore applying to all of the endpoints that communicate with that server. Thus, the number of outstanding commands to a server may be limited at the local network device (e.g., at a client level) connected to a plurality of endpoints rather than the endpoint level. If one of the endpoints triggers a transition of the remote network device to the "remote pending overload" or "remote overloaded" state, all of the endpoints may follow the associated overload procedure. By introducing such cross-endpoint procedures, the effectiveness of the overload handling procedure on clients with more than one endpoint may be increased, so that the more endpoints, the higher the gain.

In an example embodiment utilizing cross-endpoint aggregation, a MG may have a large number, e.g., 10,000 endpoints, using MGCP to communicate with its MGC. If an external event causes all 10,000 endpoints to fail rapidly one after the other (e.g. due to a line failure), the result may be 10,000 RestartInProgress messages all being sent to the MGC at the same time. Receipt of 10,000 messages may overload the MGC, which may then start sending 409 (overloaded) responses back to the MG endpoints, as described above. However, only a fraction of these responses may actually reach the endpoints before a retransmission timeout fires, causing another plethora of retransmitted RestartInProgress messages to be sent towards the MGC, and thus further exacerbating the overload situation. The situation may continue until the maximum transaction lifetime is reached, at which point the endpoints may be disconnected and another plethora of RestartInProgress messages confirming their disconnected status may be sent. The exponential backoff associated with the disconnected procedure may eventually lead to a sufficient reduction in the number of messages to enable the MGC to recover from its overload condition, however it may take a while. The method and system in accordance with the example embodiments described herein may, for example, address this problem in two ways. First of all, the total number of outstanding messages to the server may be limited, which may prevent the overload initially. If it does not, then the large number of command transmission timeouts may quickly lead the client to enter the "Remote Pending Overload" state 304, and if that does not result in sufficient message reduction, then the large number of transaction timeouts may quickly lead the client to enter the "Remote Overloaded" state 306 at which point recovery may occur.

As mentioned above, there may be 10,000 clients, each with one endpoint using MGCP to communicate with their MGC. If an external event causes all 10,000 endpoints to send a message to the MGC at the same time, the MGC may quickly overload and the endpoints go disconnected. The method and system described herein may also at least reduce the problem in these circumstances, albeit less efficiently than for clients with multiple endpoints (since advantage cannot be taken of the cross-endpoint procedures). In this example case, each endpoint may note a lack of responses which at some point may lead the endpoint to enter the "Remote Pending Overload" and/or the "Remote Overload" states at which point overload recovery begins, as described above. Use of an exponential backoff as part of this recovery may prevent the endpoints from overloading the MGC again as they eventually start sending new commands. The threshold of one or more of the counters may be configured for a particular deployment of the method or system.

Figure 4:
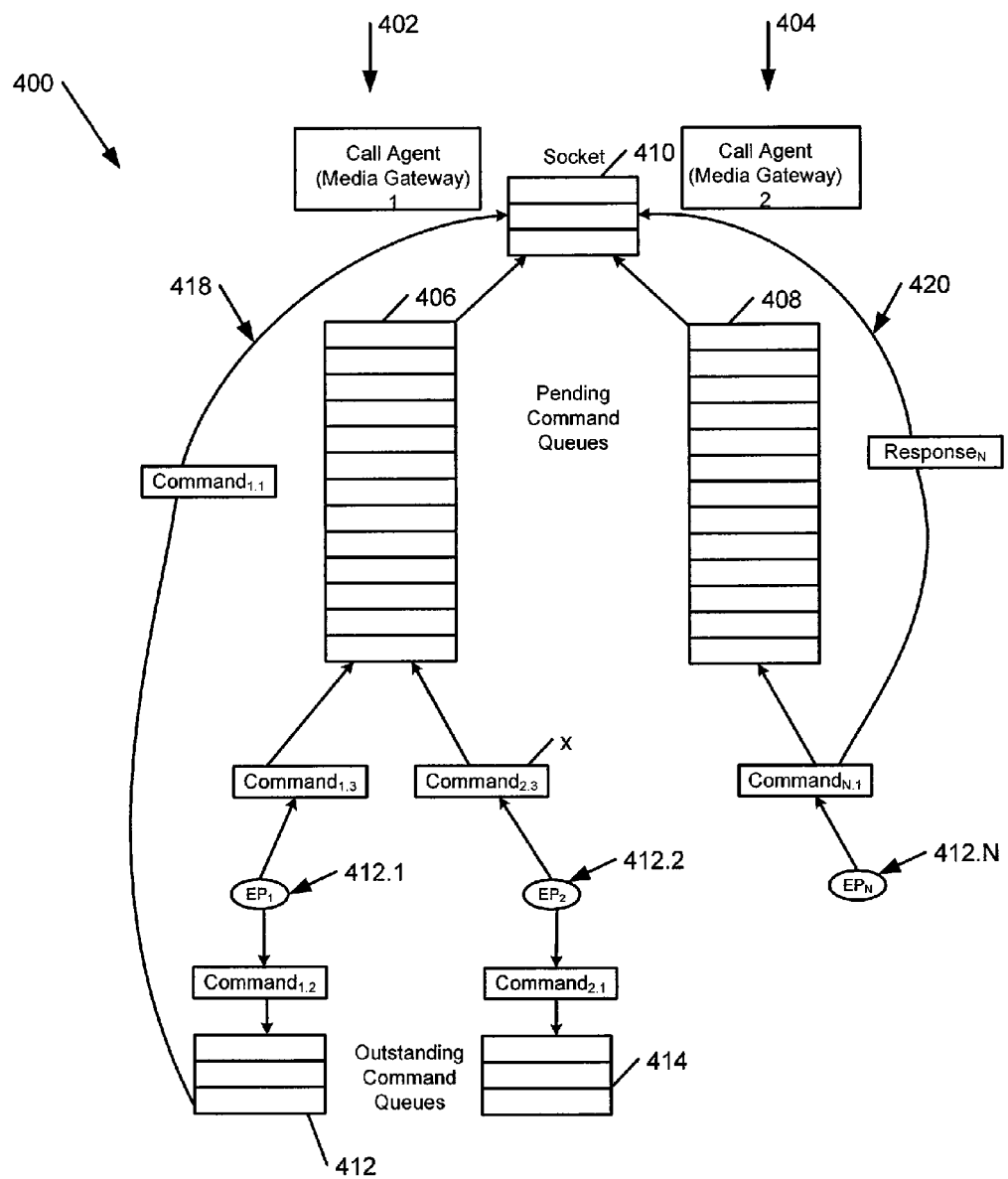
FIG. 4 shows a Call Agent or Media Gateway architecture, according to an example embodiment.

Referring now to FIG. 4, an example embodiment utilizing cross-endpoint aggregation feature will now be described in more detail with reference to an example embodiment 400 based on MGCP. On Call Agents (or Media Gateways) 402, 404, Pending Command Queues (PCQs) 406, 408 may be provided that corresponds to each Media Gateway (or Notified Entity, which identifies the server). A command to be sent by any one of the plurality of endpoints 412.1, 412.2 to 412.N is placed in the respective PCQ 406, 408. Pending Commands (e.g., Command 1.3, Command 2.3, and Command N.1) are commands in the PCQs 406, 408 waiting to be transmitted.

As indicated above, the counters may be maintained on a per server basis as opposed to on a per endpoint basis. Thus, in the case of a gateway with multiple endpoints sending to the same server, as shown in FIG. 4, a common counter may be provided that all of the endpoints share, even though normally they would operate independently. In other words, there may be a pool of commands from the endpoints 412.1, 412.2 to 412.N that need to be sent by the media gateways 402, 404 to the MGC (e.g. Call Agent). Based on the observed behavior of the pool of commands, and owing to the common counter, all of the endpoints may infer a "pending overload" state, or an "overloaded state", and they may all adjust their operation accordingly.

Outstanding Commands (OutCmds), for example, Command 1.2 and Command 2.1, represent commands that may have been sent for which a final response has not been received. Outstanding Commands may be maintained in an Outstanding Command Queues (OCQs) 412, 414 associated with one or more of the endpoints 412.1, 412.2 to 412.N for which the corresponding command was sent.

Command retransmissions (e.g., Command 1.1) and outgoing responses (e.g., Response N) may bypass the relevant PCQ 406, 408 and be sent immediately, as indicated by arrows 418 and 420. The depth of the PCQs 406, 408 may be no less than the number of endpoints feeding the queue in order to allow for at least one Pending Command per endpoint.

In an example embodiment, and as hereinbefore described by way of example, a windowing mechanism may be provided to control the sending of commands from a client to a server, once the client has inferred that the server has changed states as described above. In this regard, an Overload Window (OverWin) may be defined. From the perspective of a sending Call Agent (or Media Gateway), the OverWin may be a dynamic limit on OutCmds related to pending overload and overloaded conditions on the Media Gateway (or Notified Entity). The value of OverWin may be adjusted in response to the perceived presence or absence of overload by a client or local network device. In other words, OverWin may limit the number of commands that have been sent for which a final response has not yet been received, and may be viewed as a throttling mechanism for controlling the transmission rate of commands and may also be used to determine when the status of the remote device can move from a "Remote Overloaded" state 306 to a "Remote Pending Overload" state 304, and then again from the "Remote Pending Overload" state 304 to a "Normal" state 302.

A Receiver Window (RecvWin) may also be defined. From the perspective of a sending Call Agent (or Media Gateway), RecvWin may be an upper limit on OutCmds related to the number of Outstanding Commands a Media Gateway (or Notified Entity) can receive.

A Normal Window (NormWin) may also be defined, and may correspond to the value of OverWin upon first detecting a remote pending overload condition (e.g. a return code 101 or CmdTo>CmdToThresh as described above).

An Initial Window (InitWin) may also be defined, and may correspond to the value of OverWin on power-up.

A Minimum Window (MinWin) may also be defined, and may correspond to the value of OverWin in attempting to recover from a remote overloaded condition (e.g., return code 409 or TransTo>TransToThresh).

A Maximum Window (MaxWin) may also be defined, and may be the upper limit on OverWin.

The relationship between MinWin, NormWin and MaxWin may be as follows:

$$0 < MinWin <= NormWin <= MaxWin$$

and the relationship between InitWin and MaxWin may be as follows:

$$0 < InitWin <= MaxWin$$

As described above with reference to FIG. 3, and in an example embodiment, a local network device (e.g. a client) may infer that remote network device (e.g. a VoIP server) may be in any one of three states, as herein before described by way of example. In an example embodiment, a procedure is defined dependent upon the state, as described in more detail with reference to FIG. 5, FIG. 6, FIG. 7A and FIG. 7B. At power-up, the initial inferred (or presumed) state may default to "Normal", in which OverWin may be initialized to InitWin, and MaxWin may be initialized to RecvWin. Counters for OutCmds, CmdTo and TransTo may all be initialized to zero.

Figure 5:
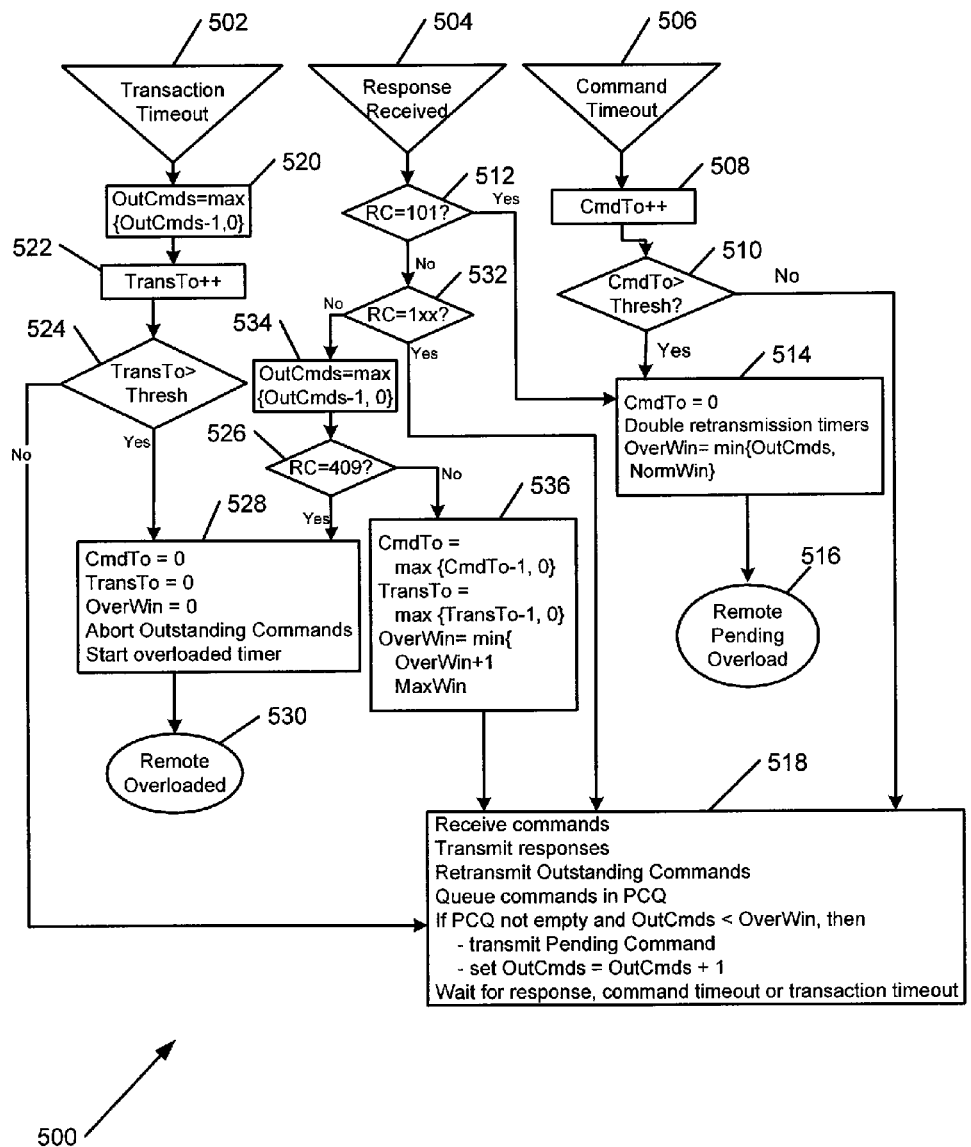
FIG. 5 shows a flow chart of a method, according to an example embodiment, for processing command messages, response messages and timeouts when a remote network device is in a normal state.

In a "Normal" state 500, as shown in FIG. 5, transaction timeouts, received responses and command timeouts are monitored, as indicated by operations 502, 504 and 506. A count of the number of outstanding commands, OutCmds, to a particular server is maintained, to ensure that OutCmds do not exceed the overload window (OverWin). In the absence of a remote overload (presumed or actual), the OverWin value may be incremented with each final response not indicating overload up to the Maximum Window, MaxWin.

As described above, a command message transmission timeout counter, CmdTo, to a particular server is maintained. The CmdTo may get incremented each time there is a command timeout, as indicated by block 508. If the command transmission timeout counter threshold, CmdToThresh, is exceeded (a presumed state or condition), as indicated by decision block 510, or a return code 101 is received (an actual state or condition), as indicated by decision block 512, the procedures listed in block 514 may be executed. These procedures may include setting the CmdTo counter to zero, doubling the retransmission timers corresponding to all outstanding commands to that server (from any endpoint on the client), setting the OverWin to the minimum of OutCmds and the Normal Window (NormWin). Thereafter, the remote pending overload procedure may be initiated, as indicated by component 516. If, at decision block 510, the command transmission timeout counter threshold has not been exceeded, the procedures listed in block 518 may be executed. These procedures include providing an indication that the remote device may receive commands and transmit responses, allowing the local device to retransmit outstanding commands, and queuing commands at the local device in the pending command queue (PCQ). Further, if the PCQ is not empty and the OutCmds is less than OverWin, the local device may transmit pending commands, the OutCmds counter may get incremented by 1, and the local device may wait for a response, a command timeout, or a transaction timeout from the remote network device.

Similarly, a Transaction Timeout Counter, TransTo, to a particular server may be maintained, as indicated by operation 502. If a transaction timeout is detected, which may be in response to the local device exhausting all retransmissions of a command, the outstanding commands (OutCmds) counter may be decremented by one, down to a minimum value of 0 (see block 520).

Each time there is a transaction timeout, the transaction timeout counter (TransTo) may get incremented by one, as indicated by block 522. If the transaction timeout counter threshold, TransToThresh, is exceeded, as indicated by decision block 524, or return code 409 is received, as indicated by decision block 526, the procedures listed in block 528 may be executed. These procedures may include the CmdTo counter and the TransTo counter being set to zero, all outstanding commands to that server (from any endpoint on the client) may be terminated, the value of OverWin may be set to 0 so that pending commands may no longer be transmitted, an overloaded timer may be started, and the "Remote Overloaded" state may be identified (and any procedures associated therewith may be initiated), as indicated at 530.

Turning to the Response Received operation 504, decision block 512 may first check to see whether a response received from the remote network device has a return code of 101. If so, then the procedures in block 514 may get carried out, as described above. If, the return code is not 101, then the next check may be to see whether the return code starts with a 1, as indicated by decision block 532. Return codes that begin with a 1 may correspond to provisional responses, which may mean that they are not final response codes and thus the command is still outstanding. Thus, the fact that the local device has sent a command and received a provisional response may not correspond to a completion of the command. If the return code does start with a 1, then the procedures in block 518 may be performed, as described above. If not, then the outstanding commands (OutCmds) counter gets decremented by one, down to a minimum value of 0 (see block 534).

The method 500 may then check to see whether a return code 409 has been received, as indicated by decision block 526, and as described above. If so, then the procedures in block 528 may be performed, as described above. If the return code 409 is not received, it may indicate that a final response not indicating overload corresponding to the command was received and thus the command may no longer be outstanding. In this case, the CmdTo and TransTo counters may be decremented, and the OverWin value may be set equal to the minimum of OverWin+1 or the maximum window (MaxWin). By adjusting the OverWin in this manner, a cap is set on the number of commands that can be transmitted, and thus the number of outstanding commands that the local device has. It should be noted that both actual operating state (via receipt of the example return commands 101 and 409 and, more generally, commands received at operation 504 from the remote network device) and an inferred operating state (see operations 502 and 506) may be used to control the transmission of packets from a local network device to a remote network device.

Figure 6:
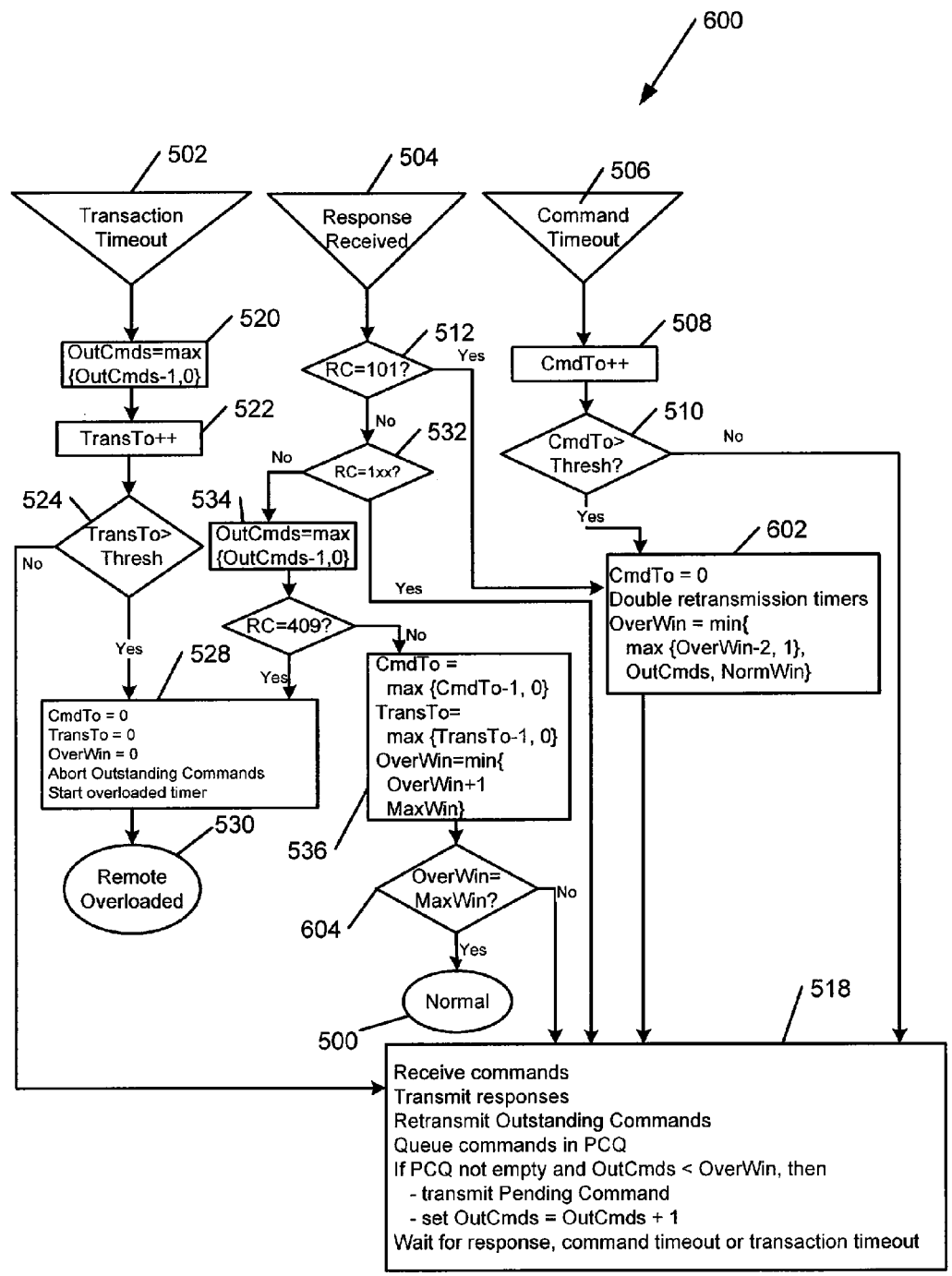
FIG. 6 shows a flow chart of a method, according to an example embodiment, for processing command messages, response messages and timeouts when a remote network device is in a pending overload state.

Referring to FIG. 6, a method 600 when a remote network device is in a "Remote Pending Overload" state or condition is described by way of example. The method 600 may build on the method 500 described above and, accordingly, like references have been used to indicate the same or similar functionality. As shown block 602, if CmdTo counter exceeds its threshold (see decision block 510), or a return code 101 is received (see decision block 512), the procedures listed in block 602 may be executed. These procedures may include setting the CmdTo counter to zero, doubling the retransmission timers corresponding to all outstanding commands to that server (from any endpoint on the client), and OverWin being decreased. OverWin is set to the minimum of: OverWin decremented by two, down to a minimum value of 1; OutCmds; and NormWin. If the number of outstanding commands had grown beyond the normal window, the overload window is again capped at the normal window. In other words, if remote pending overload conditions persist, the upper limit on the number of outstanding commands may be further reduced.

In the absence of remote overload, OverWin is incremented with each final response up to a maximum value of MaxWin, as indicated by block 536. If OverWin reaches MaxWin, as indicated by decision block 604, the client or local network device may assume or presume that the server has transitioned to the "Normal" state, and the method 500 described above with reference to FIG. 5 may then be initiated. This transition back to the "Normal" state is indicated by arrow 314 and "Normal" state 302 in FIG. 3. The remaining operations and components shown in FIG. 6 may be the same (or substantially similar) as the operations already described above with reference to FIG. 5.

Figure 7A:
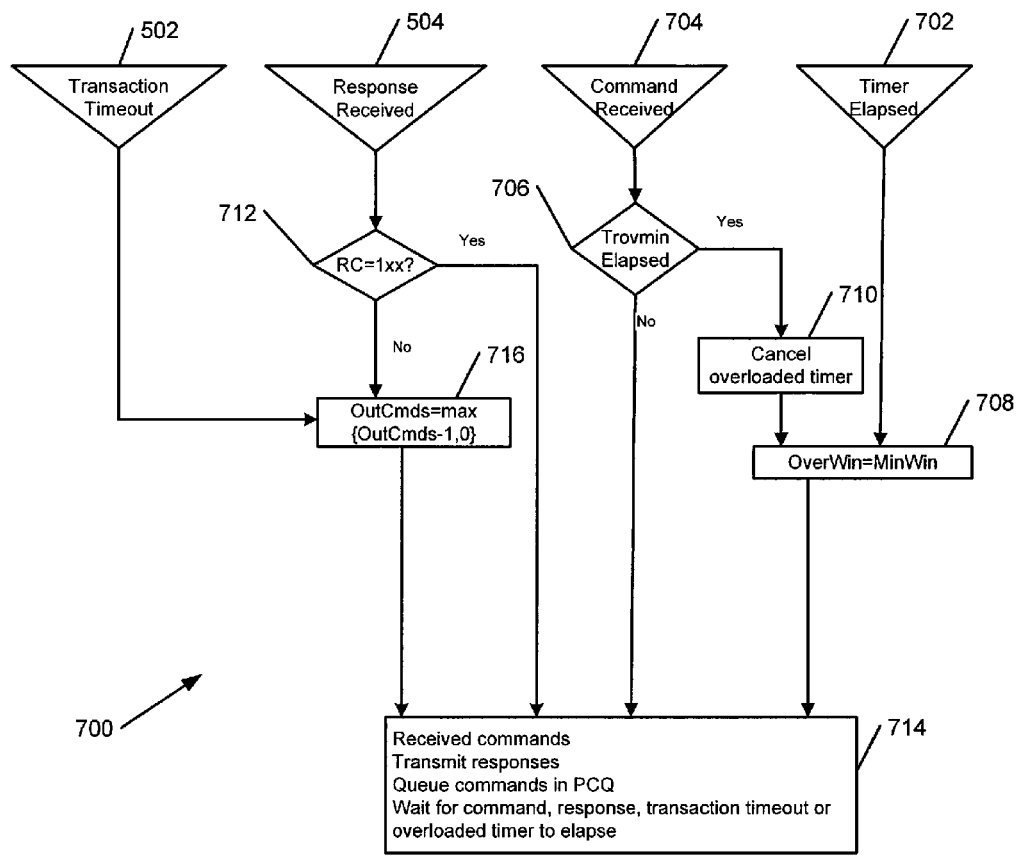
FIG. 7A shows a flow chart of a method, according to an example embodiment, for processing command messages, response messages and timeouts when a remote network device is in an overloaded state, with a timer running.

FIG. 7A shows a flow chart of a method 700, according to an example embodiment, for processing transactions and commands when a remote network device is in an overloaded state, with a timer running. The method 700 shares common functionality with the method 600 and, accordingly, like reference numerals refer to the same or similar features. As indicated above, when a remote overloaded condition or state is inferred, all outstanding commands may be aborted, the value of OverWin may be set to 0 and a timer may be started (block 528 in FIG. 5 and FIG. 6). With the value of OverWin set to 0, pending commands are not transmitted. As shown at operation 702, a timer may be monitored and, when a predetermined length of time has expired, the functionality at block 708 may be performed. In particular, the value of OverWin may be set at MinWin. Thereafter, as shown at block 714, commands may be received, responses may be transmitted, commands may be queued in the PCQ and the method 700 may wait for commands, responses, transaction timeouts, or the overloaded timer to lapse. The method at operation 704 monitors receipt of a command. If a command is received, and a provisionable "overloaded" minimum waiting delay (Trovmin) has lapsed, as indicated by decision block 706, then the overloaded timer is cancelled at block 710 and the value of OverWin may be set to MinWin, as indicated by block 708.

The method at operation 504 monitors when a response is received from the remote network device and, if so, proceeds to decision block 712 to determine whether or not the response is a provisional response. If so, the actions referred to in block 714 may be carried out. If not, the outstanding commands counter (OutCmds) is decremented, provided it is larger than zero, as shown at block 716. In operation 502, the method monitors receipt of a transaction timeout and, when received, performs the functionality as herein before described with reference to block 716.

The method 700 proceeds from any one of block 712, 716, 706, and 708 to block 714 where the functionality as hereinbefore is performed.

Figure 7B:
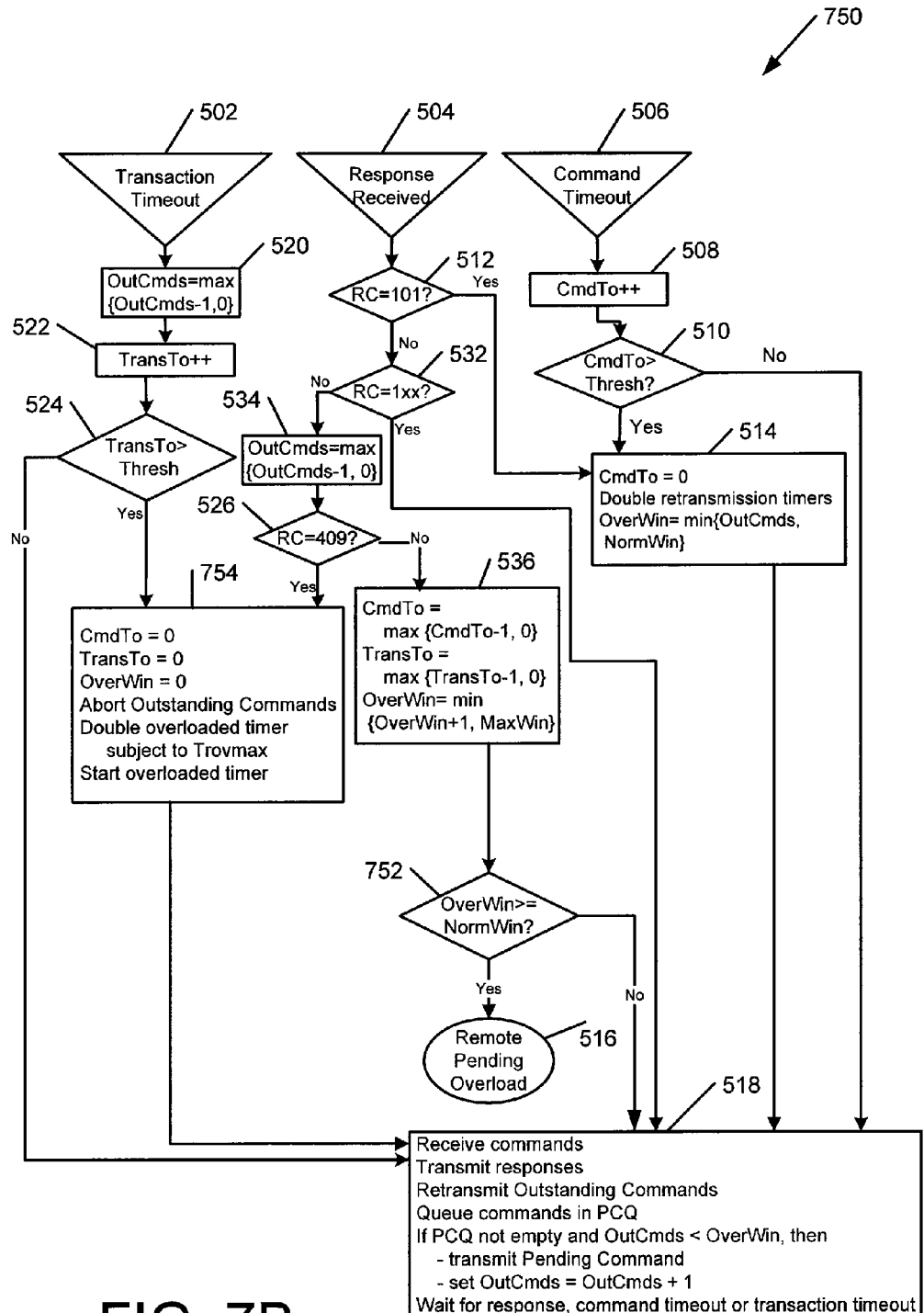
FIG. 7B shows a flow chart of a method, according to an example embodiment, for processing command messages, response messages and timeouts when a remote network device is in an overloaded state, with a timer elapsed.

FIG. 7B shows a flow chart of a method 750, according to an example embodiment, for processing transactions and commands when a remote network device is in an overloaded state, with a timer elapsed. It will be noted that in the example embodiment, the method 750 is substantially similar to the method 500 of FIG. 5 and, accordingly, like reference refer to the same or similar functionality unless otherwise indicated. It will be noted that, in the method 750 after the functionality in block 536 has been performed, at decision block 752 a comparison is performed to identify if the value of OverWin is greater than or equal to NormWin and, if so, the remote pending overload state is inferred as shown at block 516. If, however, the value of OverWin is less than NormWin the method 750 proceeds to block 518. It will also be noted that additional functionality is performed at block 754. For example, at block 754 an overloaded timer may be doubled subject to Trovmax in addition to the functionality performed at block 528. In other words, if the remote overloaded conditions persist, the period of time over which pending commands are not sent is further increased.

Figure 8:
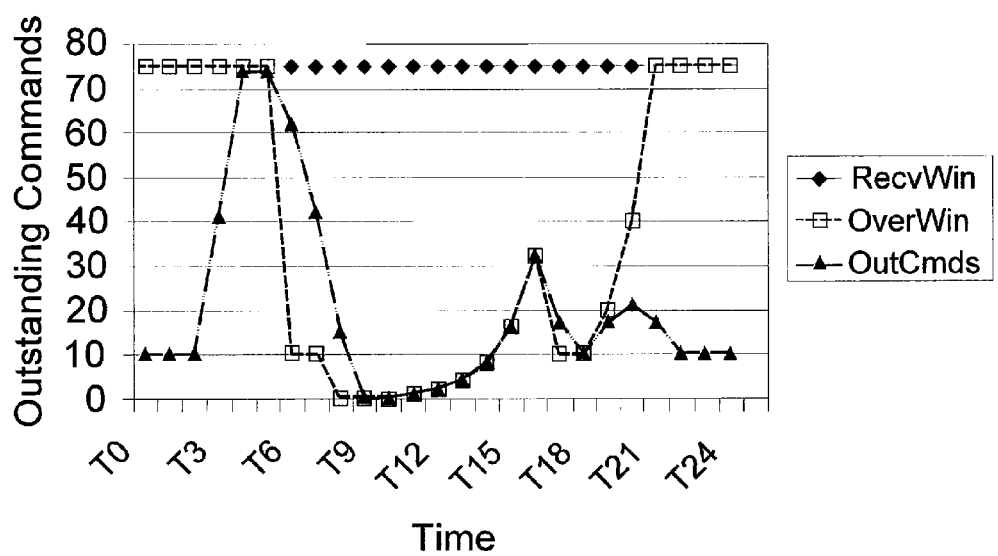
FIG. 8 shows a graph of outstanding command messages vs. time, according to an example embodiment.

FIG. 8 shows a graph of outstanding commands vs. time, according to an example embodiment. In the example embodiment, a command avalanche may take place in which a large number of commands may be generated substantially simultaneously. The example scenario is shown from the perspective of an overloaded Call Agent (remote network device), with an associated large Media Gateway. The example scenario has the following static attributes:

RecvWin=75
NormWin=10
MinWin=1
CmdToThresh=15
TransToThresh=3

Time T0-T2 may correspond to normal call processing. At time T3, an event (e.g., an OC3 line alarm) is shown to occur that results in a large number (potentially thousands) of Media Gateway commands being sent. The Media Gateway may send commands as fast as it can until the OutCmds counter equals OverWin. At time T6, the CmdTo counter is greater than or equal to the CmdToThresh (command transmission timeout counter threshold), from which the Media Gateway may infer that the remote Call Agent is in a "Remote Pending Overload" state (see state 304 in FIG. 3), and the value of OverWin may then be set to NormWin (10). The retransmission timer corresponding to all outstanding commands may then be doubled, as described above. The value of OutCmds may then be reduced to OverWin at the rate at which final responses are received. At T8, the TransTo counter is greater than or equal to the TransToThresh, from which the Media Gateway may infer that the remote Call Agent is in a "Remote Overloaded" state, and the value OverWin may then be set to zero. All outstanding commands may be aborted, and retries may be cancelled. The value of OutCmds is reduced to zero at the rate at which final responses are received or at which transactions time out. At time T11, the overloaded timer elapses. The value of OverWin may be set to MinWin (1). OverWin and OutCmds may increase exponentially in proportion to the rate at which final responses are received. At time T17, again the CmdTo counter is greater than or equal to the CmdToThresh, which may imply a "remote pending overload" state (see state 304 in FIG. 3). The value OverWin may again be set to NormWin (10). Again, OverWin and OutCmds increase exponentially. Eventually, the Media Gateway conveys all of the commands associated with the event and call processing returns to normal.

The example scenario shown in FIG. 8 demonstrates the detectability by a local network device of an overload condition in a remote network device, and the associated immediate reduction in the number of outstanding commands (and hence reduction in the observed transmission of commands compared to what would have been expected) at time T6 and the number of outstanding commands going to zero at time T8.

Figure 9:
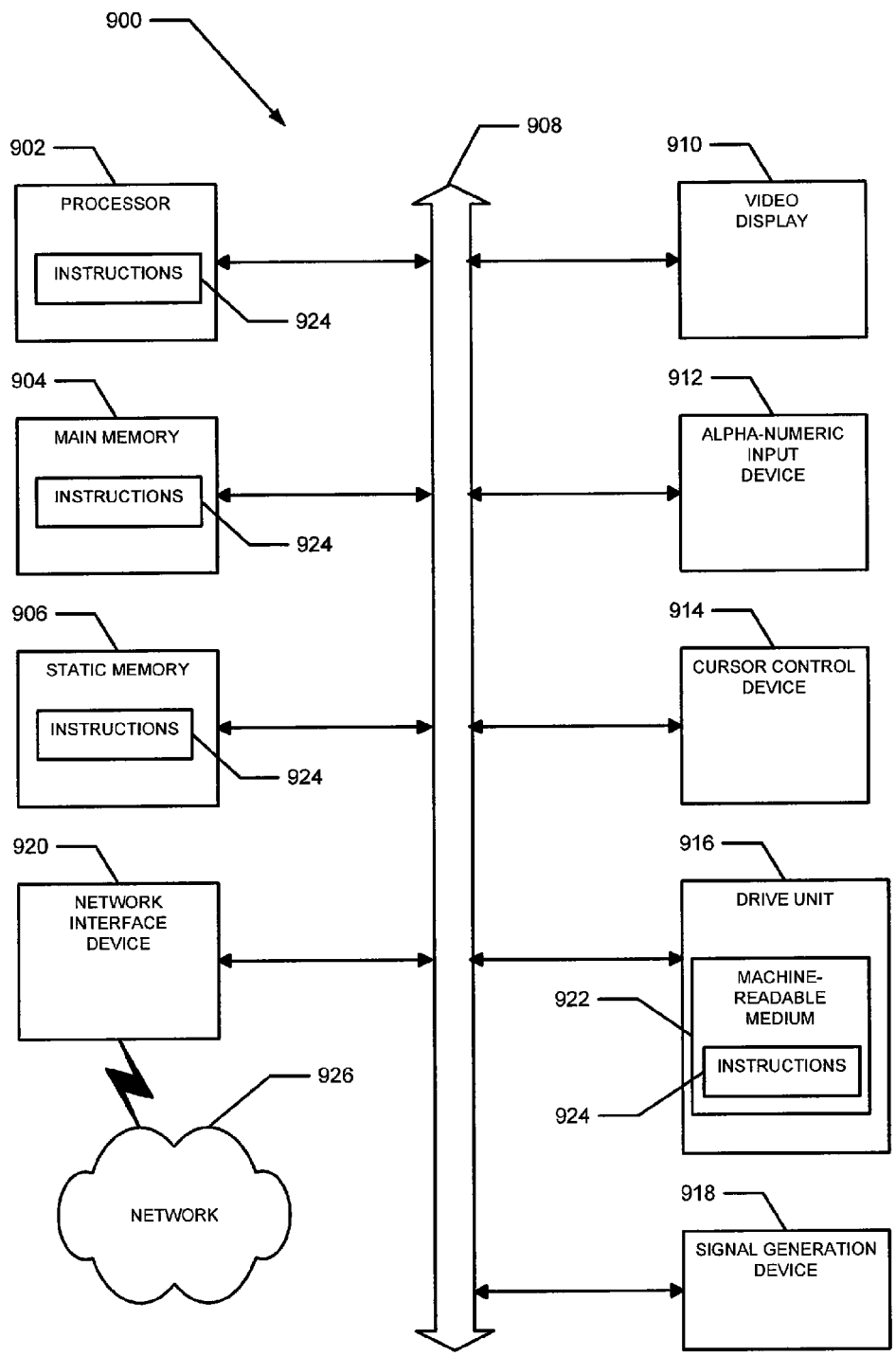
FIG. 9 shows a diagrammatic representation of machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920 utilizing any one of a number of well-known transfer protocols (e.g., HTTP).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A method for controlling communication between a local network device and a remote network device, the method comprising:
    monitoring message transmission timeouts for one or more messages sent from the local network device to the remote network device, the monitoring of the message transmission timeouts comprising:
        counting the number of message transmission timeouts for a single message or the cumulative number of message transmission timeouts for a set of messages,
        comparing the number of message transmission timeouts to a predetermined timeout threshold, and
        inferring an overload state for the remote network device when the number of message transmission timeouts exceeds the predetermined timeout threshold, the overload state being selected from a plurality of defined overload states which includes at least a remote pending overload state;
    associating an operational status with the remote network device based on the inferred overload state; and
    controlling communications from the local network device to the remote network device based on the operational status.

2. The method of claim 1, which comprises associating the operational status of the remote network device independently of a communication from the remote network device indicating its operational status.

3. The method of claim 1, in which the plurality of defined overload states further includes at least one of a normal state and an overloaded state.

4. The method of claim 1, in which the message transmission timeout comprises a command message transmission timeout and the predetermined timeout threshold is a command message transmission timeout threshold, the method comprising:
    inferring the remote overload pending state when the number of command message transmission timeouts exceeds the predetermined command message transmission timeout threshold; and
    decreasing a sending rate at which the local network device sends messages to the remote network device.

5. The method of claim 4, which comprises:
    increasing retransmission timers corresponding to outstanding commands; and
    setting an overload window to a minimum of the current number of outstanding commands and a normal window.

6. The method of claim 1, wherein the message transmission timeout comprises a transaction timeout, which occurs when retransmissions of a single message have not generated a final response message from the remote network device, and wherein the predetermined timeout threshold is a transaction timeout threshold, the method comprising:

inferring a remote overloaded state when the number of transaction timeouts exceeds the predetermined transaction timeout threshold; and aborting the retransmission of the message from the local network device to the remote network device in the remote overloaded state.

7. The method of claim 1, wherein the message transmission timeout comprises a transaction timeout, which occurs when retransmissions of a single message have not generated a final response message from the remote network device, and wherein the predetermined timeout threshold is a transaction timeout threshold, the method comprising:

inferring a remote overloaded state when the number of transaction timeouts exceeds the predetermined transaction timeout threshold; and suspending the retransmission pending commands for a period of time.

8. The method of claim 1, which comprises:

detecting a response message not indicating overload received from the remote network device; and decreasing the counted number of message transmission timeouts for the message in response to a received response message not indicating overload.

9. The method of claim 1, in which the local network device comprises a plurality of endpoints, each endpoint being capable of sending a message to the remote network device, the method comprising:

monitoring the number of message transmission timeouts across the plurality of endpoints; and inferring one of the remote pending overload state or a remote overloaded state for the remote network device at all the endpoints when the number of message transmission timeouts for any one endpoint or the cumulative number of message transmission timeouts across all the endpoints exceeds the predetermined timeout threshold.

10. The method of claim 1, which comprises:

inferring at least a normal state, the remote pending overload state or a remote overloaded state based on the monitored message timeouts; and transmitting outstanding commands at a rate that is within at least one dynamic window, the size of the dynamic window being associated with the states.

11. The method of claim 10, in which the dynamic window is an overload window that sets a dynamic limit on outstanding commands sent from the local network device to the remote network device, the overload window being related to the remote pending overload state and the remote overloaded state.

12. The method of claim 11, which comprises changing the inferred state of the remote network device from the remote pending overload state to the normal state once the overload window has grown to a maximum window.

13. The method of claim 11, which comprises changing the inferred state of the remote network device from the remote overloaded state to the remote pending overload state once the overload window has grown to a normal window value.

14. The method of claim 13, in which the overload window corresponds to the initial window value when the local network device powers up.

15. A local network device comprising:

a communication module to communicate with a remote network device; and a processor to:

monitor message transmission timeouts for one or more messages sent from the local network device to the remote network device, the monitoring of the message transmission timeouts comprising:

counting the number of message transmission timeouts for a single message or the cumulative number of message transmission timeouts for a set of messages, comparing the number of message transmission timeouts to a predetermined timeout threshold, and inferring an overload state for the remote network device when the number of message transmission timeouts exceeds the predetermined timeout threshold, the overload state being selected from a plurality of defined overload states which includes at least a remote overload pending state;

associate an operational status with the remote network device based on the inferred overload state; and control communications from the local network device to the remote network device based on the operational status.

16. The device of claim 15, in which the processor is to associate the operational status of the remote network device independently of a communication from the remote network device indicating its operational status.

17. The device of claim 15, in which the plurality of defined overload states further includes at least one of a normal state and an overloaded state.

18. The device of claim 15, in which the message transmission timeout comprises a command message transmission timeout and the predetermined timeout threshold is a command message transmission timeout threshold, the processor to:

infer the remote pending overload state when the number of command message transmission timeouts exceeds the predetermined command message transmission timeout threshold; and decrease a sending rate at which the local network device sends messages to the remote network device.

19. The device of claim 18, which comprises:

increasing retransmission timers corresponding to outstanding commands; and setting an overload window to a minimum of the current number of outstanding commands and a normal window.

20. The device of claim 15, in which the message transmission timeout comprises a transaction timeout, which occurs when retransmissions of a single message have not generated a final response message from the remote network device, and wherein the predetermined timeout threshold is a transaction timeout threshold, the processor to:

infer a remote overloaded state when the number of transaction timeouts exceeds the predetermined transaction timeout threshold; and abort the retransmission of the message from the local network device to the remote network device in the remote overloaded state.

21. The device of claim 15, wherein the message transmission timeout comprises a transaction timeout, which occurs when retransmissions of a single message have not generated a final response message from the remote network device, and wherein the predetermined timeout threshold is a transaction timeout threshold, the method comprising:

inferring a remote overloaded state when the number of transaction timeouts exceeds the predetermined transaction timeout threshold; and suspending the retransmission pending commands for a period of time.

22. The device of claim 15, in which the processor is to:

detect a response message not indicating overload received from the remote network device; and decrease the counted number of message transmission timeouts for the message in response to a received response message not indicating overload.

23. The device of claim 15, wherein the local network device comprises a plurality of endpoints, each endpoint being capable of sending a message to the remote network device, the processor to:
monitor the number of message transmission timeouts across the plurality of endpoints; and
infer one of the remote pending overload state or a remote overloaded state for the remote network device at all the endpoints when the number of message transmission timeouts for any one endpoint or the cumulative number of message transmission timeouts across all the endpoints exceeds the predetermined timeout threshold.

24. The device of claim 15, in which the processor is to:
infer at least a normal state, the remote pending overload state or a remote overloaded state based on the monitored message timeouts; and
transmit outstanding commands at a rate that is within at least one dynamic window, the size of the dynamic window being associated with the states.

25. The device of claim 24, in which the dynamic window is an overload window that sets a dynamic limit on outstanding commands sent from the local network device to the remote network device, the overload window being related to the remote pending overload state and the remote overloaded state.

26. The device of claim 25, in which the inferred state of the remote network device changes from the remote pending overload state to the normal state once the overload window has grown to a maximum window.

27. The device of claim 25, in which the inferred state of the remote network device changes from the remote overloaded state to the remote pending overload state once the overload window has grown to a normal window value.

28. The device of claim 27, in which the overload window corresponds to the initial window value when the local network device powers up.

29. A non-transitory computer-readable storage medium embodying instructions which, when executed by a machine, cause the machine to:
monitor message transmission timeouts for one or more messages sent from a local network device to a remote network device, the monitoring of the message transmission timeouts comprising:
counting the number of message transmission timeouts for a single message or the cumulative number of message transmission timeouts for a set of messages,
comparing the number of message transmission timeouts to a predetermined timeout threshold, and
inferring an overload state for the remote network device when the number of message transmission timeouts exceeds the predetermined timeout threshold, the overload state being selected from a plurality of defined overload states which includes at least a remote pending overload state;
associate an operational status with the remote network device based on the inferred overload state; and
control communications from the local network device to the remote network device based on the operational status.

30. A local network device to communicate with a remote network device, the local network device comprising:
means for monitoring message transmission timeouts for one or more messages sent from the local network device to the remote network device, the monitoring of the message transmission timeouts comprising:
counting the number of message transmission timeouts for a single message or the cumulative number of message transmission timeouts for a set of messages,
comparing the number of message transmission timeouts to a predetermined timeout threshold, and
inferring an overload state for the remote network device when the number of message transmission timeouts exceeds the predetermined timeout threshold, the overload state being selected from a plurality of defined overload states which includes at least a remote pending overload state;
means for associating an operational status with the remote network device based on the inferred overload state; and
means for controlling communications from the local network device to the remote network device based on the operational status.

* * * * *